Patented Oct. 23, 1923.

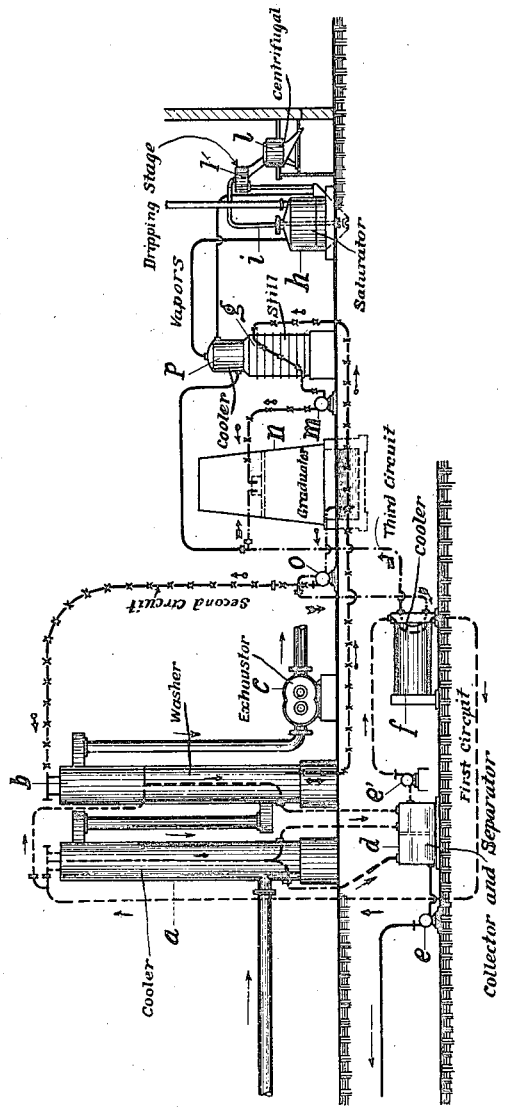

1,471,926

UNITED STATES PATENT OFFICE.

JOSEF SCHÄFER, OF DORTMUND, GERMANY.

PROCESS OF RECOVERING BY-PRODUCTS FROM GASES GENERATED BY THE DRY DISTILLATION OF COMBUSTIBLES.

Application filed December 3, 1920. Serial No. 428,172.

(GRANTED UNDER THE PROVISIONS OF THE ACT OF MARCH 3, 1921, 41 STAT. L., 1313.)

*To all whom it may concern:*

Be it known that I, JOSEF SCHÄFER, a citizen of Germany, and a resident of Dortmund, in the Republic of Prussia, Germany, have invented certain new and useful Improvements in Processes of Recovering By-Products from Gases Generated by the Dry Distillation of Combustibles (for which applications have been filed in Germany March 3, 1919, Patent No. 334,003; in Belgium June 28, 1920, Patent No. 287,998; in France July 5th, 1920, Patent No. 518,951; and in England July 8, 1920, Patent No. 147,633), of which the following is a specification.

The raw gases generated by the dry-distillation of combustibles contain valuable by-products, of which tar and ammonia are the most important. To recover these by-products hitherto two processes have been employed. One of these processes consists in washing-out the gases with water after they have been freed from tar, whereby the water absorbs the ammonia subsequently regained by distillation and finally led into an acid-bath; and the other process consists in washing the tar-freed gases with an acid directly.

Both processes, however, have their drawbacks. The first mentioned process requires a great amount of heat from an outside source and produces an extraordinarily large volume of noxious waste-water; whereas the second of these processes cannot be carried out in an absolutely reliable manner, demands a considerable supply of power for driving the gases through the saturators, and besides this depends upon a particular treatment of the so-called fixed ammonia bound by the water.

The object of my present invention is to avoid these drawbacks and it consists in not only cooling but also washing the gases with the very water condensed from these gases. This is made possible by passing said water through a set of apparatuses in three circuits partly overlapping, and from the water thus circulated certain portions are continuously, or periodically, drawn off to receive their final treatment in a saturator.

In the accompanying drawing I have represented diagrammatically by way of example an installation for carrying my new process into practice.

The hot distillation-gases coming from a coke-oven retort or the like (not shown) are cooled in a cooler $a$ by the direct irrigation with the cooled ammoniacal water condensed from previous distillation-gases while being cooled. The temperature of these gases is reduced until the precipitation of tar is effectively carried through. With the cooler $a$ there is connected a washer $b$ wherein the washing-out of ammonia takes place, which washer is likewise operated with cooled ammoniacal water. By means of a gas-suction device $c$ said gases are drawn through these two apparatuses and after having been cooled and washed therein they are conveyed by pressure to the desired point or place. The tar and the ammoniacal water precipitated during the cooling of the gases as well as the water used in the washing of the tar-freed gases are directed to a collector $d$, wherein the tar and the ammoniacal water separate from each other on account of their different specific gravities. By the aid of a pump $e$ the tar is utilized for rinsing the receiver of the gas generator (not shown) and is then conveyed to a separate receptacle (likewise not shown) wherein the tar is finally freed from its watery admixtures. The tar now represents a marketable product ready for delivery.

The ammoniacal water contained in the collector $d$ is pressed by a pump $e'$ through a cooler $f$, wherein it is cooled and then passed onward to be utilized again for the cooling of raw distillation-gases flowing into the cooler $a$, and for washing them after they have entered the washer $b$. According to the foregoing there exists a circulation of the ammoniacal water through the collector $d$ the cooler $f$ and the cooler $a$ arranged in parallel with the washer $b$. This course of the condensed ammoniacal water I designate as the first circuit. From the ammoniacal water enriched with ammonia while passing through the washer $b$ a certain portion is continuously, or periodically, drawn off and thus excluded from further participating in the action of the first circuit explained above. This withdrawn portion of the ammoniacal water is drawn by a pump $m$ through a distillation-apparatus $g$, wherein it is distilled, without any addition of lime being made. The ammonia-vapors generated hereby are either converted into concentrated ammoniacal water, or they are led into an acid or saturation-bath $h$. In the latter instance ammonium-sulphate is formed in said bath and is lifted by means of an inverted U-shaped pipe $i$ on to a dripping-stage $k$, from whence it is directed to a centrifugal machine $l$ for drying purposes, which machine it leaves as a marketable product.

The water remaining in the distillation-apparatus $g$ still contains the fixed ammonia, because by means of steam without an addition of lime only the free or volatile ammonia can be driven off. The water still containing said fixed ammonia is lifted by the aid of the pump $m$ up to a graduator or evaporation-cooler $n$ and is here cooled, by a partial evaporation of the water. From here the water can be compelled by means of a pump $o$ to follow two ways. The one way is to transfer the water to the washer $b$, to be utilized in washing tar-freed gases coming from the cooler $a$, during which washing-operation such water absorbs additional ammonia, and this product of washing is returned to the distillation-apparatus $g$ to be redistilled. This course of the ammoniacal water I call the second circuit. The ammonia-vapors generated hereby are, of course, led to the saturation-bath $h$ again, as already explained above. The second way is to force the water from the tower-like evaporation-cooler $n$ through the liquid-cooler $f$, to act herein as a cooling-medium on the ammoniacal water coming from the cooler $a$ and the washer $b$, from whence the distilled ammoniacal water is returned again to the evaporation-cooler $n$. This course of the water I denote as the third circuit.

By means of this continuous circulation of the ammoniacal water through the evaporation-cooler $n$ the percentage of fixed ammonia carried by this water steadily increases. In order to keep the degree of saturation within fixed limits, a portion of said ammoniacal water is continuously, or periodically, taken from the third circuit and passed through a reflux-cooler $p$ arranged upon the distillation-apparatus $g$ wherein such water is reheated, to be then led to the saturation-bath $h$. The acid contained in this saturation-bath combines with the fixed ammonia introduced by the ammoniacal water coming from the reflux-cooler to form ammonium-sulphate. The water introducing the fixed ammonia into the saturation-bath is evaporated in such bath and leaves as steam with the escaping sulphureted hydrogen and the carbonic-acid. The ammoniacal water thus drawn off and treated in the reflux-cooler and in the saturation-bath is preferably replaced by a corresponding volume of fresh condensate which is introduced in any suitable manner into the second circuit, in order to dilute the ammoniacal water of said circuit sufficiently to prevent its concentration from exceeding the desired limit.

Instead of actuating the first circuit at pleasure in connection with the second or with the third circuit, it is, of course, also possible to operate the three circuits simultaneously. For doing so it would be only necessary to provide the third circuit with a separate pump (not shown), which would draw cooled ammoniacal water from the evaporation-cooler $n$ independently of the pump $o$.

When a portion of the driven-off and cooled ammoniacal water is continuously, or periodically, forced by means of the pump $o$ from the evaporation-cooler $n$ into the washer $b$, it is of advantage to irrigate the upper part of said washer only with water containing fixed ammonia, whereas the under part thereof in addition to this is also irrigated with ammoniacal water from the first circuit.

It is, of course, possible to obtain ammonium-chloride in a marketable form from the water containing fixed ammonia by concentrating it—for instance by evaporation—outside of the installation shown.

Thus my present invention requires but an exceptionally small amount of steam for distilling the ammoniacal water, and it is not necessary to add water from any outside source to the water contained in the gases, which water is to the greater part evaporated on the evaporation-cooler $n$. The remainder of this water is forwarded to the saturation-bath, where it is completely used up, so that no noxious waste-water is produced. Since in this process the cooling of the raw gases is accomplished in a direct way, not only the great advantage of a better cooling-action, but also the benefit of a good separation of tar and naphthalene are assured.

I claim:—

1. The process of recovering by-products from gases generated by the dry-distillation of combustibles, which consists in first cooling and washing said gases solely with ammoniacal water condensed from said gases; separating from said ammoniacal water the tar which it has taken up from the gases during said cooling operation; cooling said tar-freed ammoniacal water; reusing said cooled ammoniacal water for cooling and washing raw distillation-gases; drawing off a portion of said ammoniacal water employed in washing said gases; distilling said drawn-off ammoniacal water; cooling by evaporation said distilled ammoniacal water now chiefly containing fixed ammonia; using the ammoniacal water thus distilled and cooled by evaporation for washing tar-freed distillation gases.

2. The process of recovering by-products from gases generated by the dry distillation of combustibles, which consists in cooling and washing said gases solely with ammoniacal water condensed from said gases; leading off such gases immediately after the washing operation; separating from said ammoniacal water the tar taken up from the gases during the cooling operation; cooling the tar-free ammoniacal water thus obtained re-using such cooled ammoniacal water for cooling and washing raw distillation gases; branching off a portion of said ammoniacal water employed for washing said gases; distilling such branched-off ammoniacal water, and returning the remainder of said distilled ammoniacal water to said washing operation.

3. The process of recovering by-products from gases generated by the dry distillation of combustibles, which consists in cooling and washing said gases solely with ammoniacal water condensed from said gases; leading off the gases immediately after the washing operation; separating from said ammoniacal water the tar taken up from the gases during the cooling operation; cooling the tar-free ammoniacal water thus obtained; re-using such cooled ammoniacal water for cooling and washing raw distillation gases; diverting a portion of the ammoniacal water employed for washing said gases; distilling such diverted ammoniacal water; cooling by evaporation, the remainder of said distilled ammoniacal water; utilizing the ammoniacal water cooled by evaporation, as a cooling medium for the tar-free ammoniacal water; again cooling said cooling medium by evaporation, and returning the recooled remainder of said cooling medium to said washing operation.

4. The process of recovering by-products from gases generated by the dry distillation of combustibles, which consists in cooling and washing said gases solely with ammoniacal water condensed from said gases; leading off such gases immediately after the washing operation; separating from said ammoniacal water, the tar taken up from the gases during the cooling operation; re-using said cooled ammoniacal water for cooling and washing raw distillation gases; diverting a portion of the ammoniacal water employed for washing the gases; distilling the ammoniacal water thus diverted; cooling by evaporation the remainder of said distilled ammoniacal water; utilizing the ammoniacal water cooled by evaporation, as a cooling medium for ammoniacal water that has been freed from tar; diverting a portion of such cooling medium and introducing this diverted portion into a saturation bath; exposing the remainder of said cooling medium to evaporation, and returning the remainder thus recooled, to the aforesaid washing operation.

5. The process of treating gases containing tar and ammonia, and of treating the liquid employed in the treatment of such gases, which consists in washing such gases with water to take up ammonia and tar, removing first tar and then ammonia from water which has been used for washing such gases, and washing further amounts of such gases with water from which tar and ammonia have thus been removed.

6. The process of treating gases containing tar and ammonia, and of treating the liquid employed in the treatment of such gases, which consists in washing such gases with water to take up ammonia and tar, removing the gases thus washed, from contact with such water, removing first tar and then ammonia from water which has been used for washing such gases and which has been separated from them, and washing further amounts of such gases with water from which tar and ammonia have thus been removed.

Signed by me at Dortmund, Germany, this 8 day of October, 1920.

JOSEF SCHÄFER.

Witnesses:
ERNST JACOBS,
HEINRICH HOUPE.